Jan. 18, 1938.   S. F. GLEASON   2,105,941
MEAT PROCESSING AND MOLDING DEVICE
Filed Aug. 23, 1933
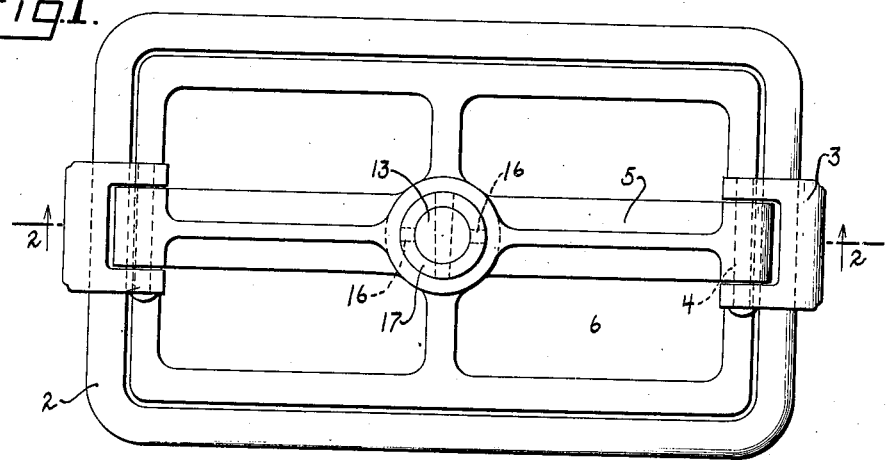
Fig.1.
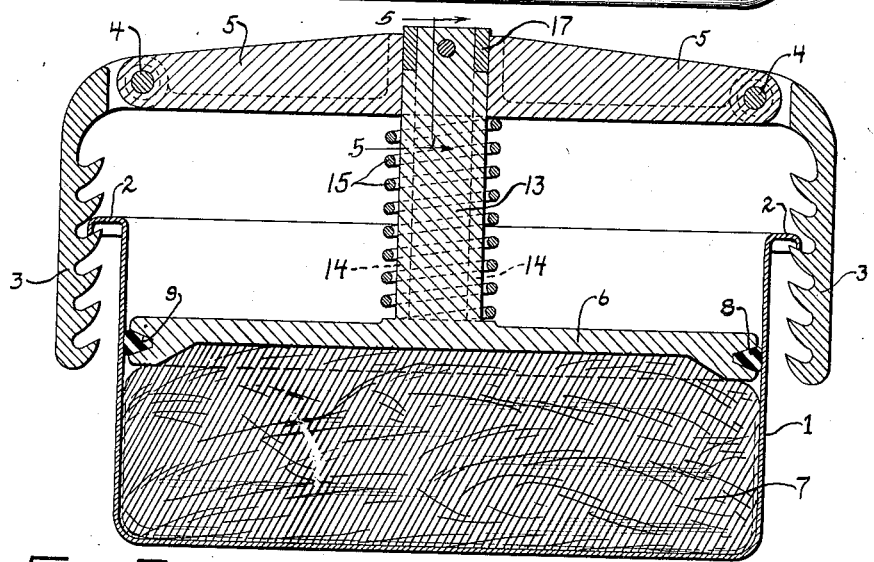
Fig.2.
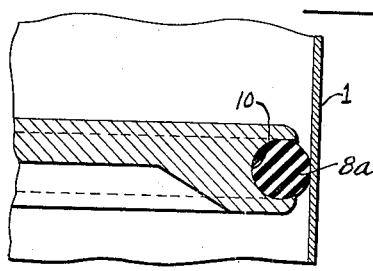
Fig.3.
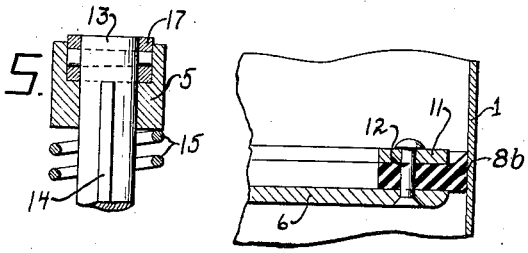
Fig.5.
Fig.4.
INVENTOR
Stanley F. Gleason,
BY Louis Necho
ATTORNEY Patented Jan. 18, 1938

2,105,941

UNITED STATES PATENT OFFICE 2,105,941

MEAT PROCESSING AND MOLDING DEVICE

Stanley F. Gleason, Philadelphia, Pa., assignor to Ham Boiler Corporation, Port Chester, N. Y., a corporation of Delaware Application August 23, 1933, Serial No. 686,358

6 Claims. (Cl. 100—57)

My invention relates to a new and useful meat processing and molding device and it relates more particularly to a device especially adapted for the processing and molding of partly or completely preserved meats, such as hams and other boned meats, which are subjected to a preliminary partial cooking and molding operation preparatory to sale in bulk or in sliced condition, this application being a continuation in part of my co-pending application, Serial Number 602,365, filed March 31, 1932, and entitled Apparatus for processing and molding meats.

My invention further relates to a device of this character whereby a considerable saving in the loss ordinarily due to shrinkage of meats thus treated is effected, consistent with the production of a finished product having the proper constituency, that is one which retains its form when subjected to handling and slicing and one which at the same time contains the most advantageous proportion of its own juices and their natural inherent component elements.

My invention still further relates to a device of this character which, while serving to process the meat in its own juice and to preserve in said meat in the finished form the maximum desired amount of such juices, does nevertheless permit the escape during the processing operation of some of the liquids that extrude from the meat, thus relieving the meat to a considerable extent of the curing liquids in which such meat was saturated during the pickling or preserving operations preceding the partial cooking, processing and molding thereof.

My invention still further relates to a device of this general character in which the meat being processed and molded is subjected to continuous resilient following pressure which may be so predetermined as to subject the meat to sufficient compression to impart to the meat the form or contour of the mold or container employed.

To the above ends, my invention consists of a mold or container having the desired form, size and contour and adapted to receive the meat to be processed and molded, a follower plate or plunger adapted for vertical movement within said mold, means for applying a predetermined tension to said follower plate, and a flexible, resilient, "one-way" seal or gasket carried by the periphery of said follower plate and having sliding relation with respect to the walls of said mold to prevent the ingress of the cooking liquid in which the mold is immersed during the processing operation into the mold and to permit occasional partial extrudance from the mold of some of the juices excreted from the meat when the latter is subjected to a raised temperature during the processing operation, the extrudance of such juices being possible only when the pressure within the mold below the follower plate exceeds the predetermined force or strength of the sealing means carried by said follower plate.

My invention further consists of various other novel features of construction and advantage, all as hereinafter described and claimed in connection with the accompanying drawing in which:

Fig. 1 represents a plan view of a processing and molding device embodying my invention.

Fig. 2 represents a section on line 2—2 of Fig. 1.

Figs. 3 and 4 represent fragmentary sectional views of modified forms of the sealing gasket shown in Fig. 2 and forming part of my invention.

Fig. 5 represents a section on line 5—5 of Fig. 2.

Referring to the drawing in which like reference characters indicate like parts, 1 designates the mold or casing which may be of any desired size, shape or contour, and which is preferably made of a stainless steel or other desirable material.

The casing or mold 1 is provided with the outwardly turned flange 2 which is adapted to be engaged by the ratchet 3 which is pivoted at 4 to the cross bar 5. Within the casing 1 is disposed the follower plate or flange 6 which is adapted to bear upon and compress and mold the ham or other boned meat 7 in a manner hereinafter further explained. The follower plate 6 is provided with a resilient, flexible gasket 8, which is preferably made of soft, live rubber or other flexing material which would permit the outer periphery of the gasket to yield or give under pressure and which will at the same time provide sufficient sealing action for a purpose and in a manner hereinafter more fully explained. The gasket 8 may be secured to, carried by or associated with the periphery of the plunger or follower plate 6 in any desired manner, which, while giving sufficiently rigid support, will also permit the desired amount of flexibility and yielding action necessary in connection with the cooking and processing operation hereinafter more fully set forth. In Fig. 2, I have illustrated the gasket 8 as being seated in a peripheral groove 9, while in Fig. 3 I have shown a gasket 8a of a circular cross section seated within a groove of corresponding formation 10. In Fig. 4, I have illustrated a gasket 8b as resting upon the periphery of the follower plate 6 with an upper retaining member 11, the assembly being secured by means of a rivet, bolt or the like 12. Integral with or rigidly secured to the plate 6 is the operating rod or arm 13 which is provided with the lateral splines or ribs 14 and around which is coiled the spring 15. The splines 14 are adapted to be engaged by corresponding key-ways 16 on the hub or center of the cross bar 5 and are adapted to abut against a retaining ring or stop member 17 whereby the cross bar 5 is permitted to move vertically relative to the arm 13 without disconnection of the arm 13 from the bar 5 when the ratchets 3 are disengaged from the flange 2. In other words, by disengaging the ratchets 3 from the flange 2 and raising the cross bar 5 the arm 13 and follower plate 6 are raised also, and at the same time the cross bar 5 is permitted to slide vertically upon the arm 13 to effect compression of the tensioning means 15.

The operation is as follows: the meat to be processed and molded, which is usually in the shape of a ham, a leg of lamb, or the like, is placed in the container 1 and the pressure plate 6 is applied to the upper surface of the meat. Pressure is then applied to the top of the cross bar 5 to press the spring 15 and the ratchets 3 are then engaged at the desired point with the flange 5. This results in fixing the position of the cross bar 5, thus permitting the spring 15 to exercise constant following pressure on the meat 7. The entire unit is then positioned in the cooking liquid, which is water at a certain temperature, and allowed to cook for a predetermined length of time. The effect of the temperature and the pressure tends to effect partial softening of the meat and also results in the extrudance from the meat of the juices initially contained therein, whether such juices be the natural meat juices or the curing liquids absorbed by the meat during the curing operation. The heat further expands the meat against the tension of the spring 15. When the pressure in the container or mold below the follower plate 6 has reached a predetermined point, the resilient, flexible gasket 8 tends to yield or give, thus permitting the escape of a certain amount of the juices extruded from the ham into the cooking liquid. When the pressure within the container under the follower plate 6 has thus been partially relieved by a partial escape of the juices extruded from the meat, the gasket 8 again effects a complete seal to prevent ingress of the cooking liquids into the container. As the meat is softened by the temperature, the pressure of the follower plate thereon tends to compress it into a form corresponding to the inner form or contour of the mold formed of the vertical walls of the casing, the underside of the follower plate, and the bottom of the casing, and the process continues until the meat has been sufficiently processed, whereupon the mold as a unit is removed from the cooking liquid and permitted to cool. This results in the congealing of the meat in the container as well as the juices extruded from the meat, but remaining within the mold, into a uniform, homogeneous mass which lends itself to easy and effective slicing and which produces a finished product having a maximum amount of natural juices conserved therein consistent with the desired constituency of the finished product.

It will thus be seen that by means of my novel mold I process the meat in a container which does not permit the contamination of the meat by means of the cooking fluid in which the container is immersed, and which at the same time permits the partial escape into the cooking liquid of some of the juices extruded by the meat under temperature—first, to relieve the meat of some of the curing liquids originally contained therein; second, to preserve in the meat an amount of the natural juices thereof sufficient to produce proper homogeneity and constituency; and, third, to permit the escape of the excess juices directly into the cooking liquid to prevent their congealing on the parts of the container above the follower plate 6, thus obviating the necessity of repeated cleansing of the parts.

It will thus be also seen that by my novel construction excessive shrinkage of the ham, which necessarily results when all the meat juices extruded therefrom are permitted to escape, is eliminated, and that, on the other hand, I produce meat of the proper slicing constituency which cannot be produced if all the liquids or juices originally contained in the meat were to be retained in the finished product, as would happen in the case of completely confined containers which do not permit the escape of any of the juices extruded from the ham during the processing operation.

While I have in the accompanying drawing illustrated a specific form of my processing and molding device, in which I have shown a particular form of spring, a particular form of cross bar, casing, ratchets, flange, as well as three forms of the one-way sealing gasket, it is to be understood that the essence of my invention resides in the construction of an apparatus which embodies a movable seal in order to permit constant, uniform following pressure on the meat, and which at the same time permits the partial escape from the mold of the juices extruded from the meat during the processing operation, while at the same time effectively prevents the ingress into the mold of the cooking liquid or other extraneous matter, and that I, therefore, do not wish to be limited to the exact form of mechanical construction shown, it being understood that the device shown in the drawing is merely illustrative of the invention and not delimitive thereof.

Having thus described my invention, what I claim as new and desire to secure by Letters Patent is:

1. An apparatus for processing and molding meat, comprising a mold adapted to contain the meat to be processed and molded, a follower member movable within said mold, said follower member having a single extension projecting outwardly therefrom, means for applying following pressure to said follower member, said means comprising an element adapted to receive said extension in slidable but non-rotatable engagement, resilient means positioned between said follower member and said element and tending to cause them to separate, means carried by said extension to limit the extent of said separation, means on said element adapted to engage portions of said mold when said follower is placed on meat within the mold and to be held in place when said resilient means is compressed so as to exert a pressure on said meat, a flexible, resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member.

2. An apparatus for processing and molding meat, comprising a mold adapted to contain the meat to be processed and molded, a follower member movable within said mold, said follower member having a single extension projecting outwardly threfrom and provided with longitudinal ribs thereon, means for applying following pressure to said follower member, said means comprising an element provided with an opening therein having grooves, said opening being adapted to receive said extension and said grooves being adapted to receive said ribs on said extension, resilient means positioned between said follower member and said element and tending to cause them to separate, means carried by said extension to limit the extent of said separation, means on said element adapted to engage portions of said mold when said follower is placed on meat within the mold and to be held in place when said resilient means is compressed so as to exert a pressure on said meat, a flexible resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member.

3. An apparatus for processing and molding meat, comprising a mold adapted to contain the meat to be processed and molded, a follower member movable within said mold, means for applying following pressure to said follower member, a flexible, resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member, said sealing member having a cross-section such that its width is maximum at its peripheral portions and is less than said maximum at its inner portions.

4. An apparatus for processing and molding meat, comprising a mold adapted to contain the meat to be processed and molded, a follower member movable within said mold, means for applying following pressure to said follower member, a flexible, resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member, said sealing member having a wedge-shaped cross-section that increases in width toward the periphery, and being seated in a groove of complementary cross-section provided in said supporting means.

5. An apparatus for processing and molding meat, comprising a mold adapted to contain the meat to be processed and molded, a follower member movable within said mold, means for applying following pressure to said follower member, a flexible, resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member, said sealing member having a cross-section that is uniform in width at its inner portions, and of increased width at its peripheral portions.

6. An apparatus for processing and molding meat, comprising a mold adapted to contain the meat to be processed and molded, a follower member movable within said mold, means for applying following pressure to said follower member, a flexible, resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member, said sealing member having a cross-section that is uniform in width at its inner portions, and of increased width at its peripheral portions, so as to form an outwardly extending lip whereby an effective seal against external pressure will be provided.

STANLEY F. GLEASON.